United States Patent

[11] 3,620,667

[72] Inventor William E. Zimmie
5192 Park Lane, North Olmsted, Ohio 44070
[21] Appl. No. 877,865
[22] Filed Nov. 18, 1969
[45] Patented Nov. 16, 1971
Continuation-in-part of application Ser. No. 808,374, Mar. 13, 1969, now abandoned, which is a continuation of application Ser. No. 464,868, June 17, 1965, now abandoned. This application Nov. 18, 1969, Ser. No. 877,865

[54] METHOD OF REMOVING TUBERCLES FROM A FERROUS SURFACE AND INHIBITING FURTHER TUBERCLE FORMATION THEREON
5 Claims, No Drawings

[52] U.S. Cl. ..................................... 21/2.7, 134/22 R
[51] Int. Cl. ............................................ C23f 11/12, C23f 11/14, B08b 9/08
[50] Field of Search .......................... 21/2.5, 2.7; 134/22; 210/54; 252/309, 390, 392, 394, 396

[56] References Cited
UNITED STATES PATENTS
2,529,178 11/1950 Nieland et al. ................. 21/2.7
3,085,916 4/1963 Zimmie et al. ................. 134/22

Primary Examiner—Joseph Scovronek
Assistant Examiner—Barry S. Richman
Attorney—Fay, Sharpe and Mulholland ABSTRACT: Treating a ferrous surface to remove tubercles of corrosion and inhibit further corrosion includes the steps of providing an aqueous solution of polyelectrolytic organic polymer and applying it to the corroded ferrous surface. The polymer (1) is prepared from compounds characterized by the formula:

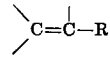

wherein R is selected from the group consisting of nitrile, amide and carboxyl radicals, (2) has an average molecular weight ranging from about 25,000 to 25 million and (3) has a weight concentration of 0.1 to 1,000 parts per million parts of water.

METHOD OF REMOVING TUBERCLES FROM A FERROUS SURFACE AND INHIBITING FURTHER TUBERCLE FORMATION THEREON

This application is a continuation-in-part of copending application Ser. No. 808,374, filed Mar. 13, 1969, now abandoned, which was a continuation of copending of application Ser. No. 464,868, filed June 17, 1965, now abandoned.

BACKGROUND OF THE INVENTION

The problems due to corrosion are so numerous that the costs involved are extremely difficult to measure. In addition to the deterioration and loss of equipment itself, due to corrosion, the costs involved in connection with down time for maintenance and repair, and contamination of the related system with corrosion products are also significant considerations. In many applications the equipment is constructed from corrosion resistant materials, such as copper or stainless steel, but the economic considerations limit this technique of eliminating corrosion problems.

The ferrous materials are generally preferred for the construction of the vast majority of water handling equipment in view of its physical properties and initial cost. However, the ferrous materials tend to corrode readily, particularly at elevated temperatures and when in contact with untreated water. Corrosion is particularly troublesome in such equipment as cooling towers, either once through systems or recirculating systems, heat exchangers and other equivalent equipment used in connection with large volumes of water. The actual rate of corrosion, whether by chemical attack or galvanic action, is determined by the composition of the metal, the pH of the water passing through the system, the amount of dissolved oxygen in the water, the velocity of the water, as well as numerous other environmental factors. While actual chemical attack of metals is found in various industrial applications, these are so specialized that each case requires an individual consideration and accordingly the prevention of corrosion by chemical attack is beyond the scope of this application.

Particularly troublesome in heat transfer and cooling equipment is the corrosion process known as tuberculation which is the formation of localized corrosion products scattered over the surface of the metal in the form of knoblike mounds. These tubercles consist of mounds of corrosion products covering anodic areas where pits are developed. At first the rate of penetration is increased underneath the tubercles, but later on when they become more impermeable the rate of attack may be greatly reduced. These tubercles are further objectionable since they reduce the rate of flow through the equipment, thereby reducing the efficiency and finally will completely clog the system unless it is disassembled and cleaned. In the process of tuberculation a thin shell or membrane of ferric oxide forms over the corrosion products after they become a certain thickness, so that diffusion to and from the water saturated with dissolved oxygen is impeded somewhat and corrosion tends to slow down. However, free oxygen is greatly reduced inside of the tubercles, the concentration of negative ions increased, and the pH lowered. These conditions will of course cause some corrosion with the evolution of hydrogen. A differential oxygen cell is set up so that corrosion may proceed in a tubercle that seems to be impervious. The iron oxides in the shell are cathodic to the corroding metal and may be reduced to the softer ferrous iron on the inside by atomic hydrogen when the dissolved oxygen is low. At the same time the more soluble ferrous iron diffuses through the shell and is oxidized, thus building up the shell from the water side.

The known practices of preventing or inhibiting corrosion, whether in the form of tuberculation or other galvanic action, includes the use of an imposed e.m.f., the use of a less noble sacrificial metal, water pretreatment to reduce the dissolved oxygen and the use of various compounds as corrosion inhibitors. However, the known corrosion inhibitors have not been entirely successful for one or more of the following reasons: (a) excessive costs when used in effective concentrations, (b) incompatibility with other additives, such as scale reducing materials, (c) a loss of effectiveness and a tendency to become aggressive below certain concentrations, (d) a tendency to promote foaming.

BRIEF DESCRIPTION OF THE INVENTION

It was discovered quite unexpectedly that the use of a very small amount of a water-soluble polyelectrolytic polymer removes existing corrosion products in some cases, arrests further corrosion due to galvanic action and forms a protective coating on a substrate surface and thereby inhibits corrosion.

Accordingly it is an object of this invention to provide a simple and inexpensive method of preventing corrosion in water systems constructed of iron and steel.

Another object of this invention is to provide a method of inhibiting corrosion in water systems by adding to the water a very small amount of water-soluble polyelectrolytic organic polymer.

A further object of this invention is to provide a method of removing existing corrosion products and preventing the further formation of same in water systems constructed of ferrous materials by adding a very small amount of a water-soluble polyelectrolytic organic polymer to the water passing through the system.

A still further object of this invention is to provide a method of inhibiting corrosion of iron and steel water systems by adding a small amount of a water-soluble polyelectrolytic organic polymer to the water to thereby effectively reduce galvanic action.

It has now been discovered that very small amounts of certain polyelectrolytic organic polymers, known in the prior art to be effective as flocculating agents, are extremely effective in inhibiting corrosion of ferrous materials in contact with water. More particularly it has been found that less than 2 percent by weight of these polymers, based on the weight of the water, are effective in preventing this corrosion.

PREFERRED EMBODIMENTS

Polyelectrolytes which have been found effective in preventing or inhibiting the corrosion of iron and steel include the polymers prepared from compounds having the formula:

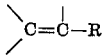

wherein R is selected from the group consisting of nitrile, amide, and carboxyl radicals, COOM where M is a lower alkyl radical preferably of one to four carbon atoms, and the water-soluble salts thereof. Elements such as halogens, particularly chlorine, or alkyl or aryl groups as well as hydrogen may be present on the backbone hydrocarbon chain of the polymer.

Particularly suitable polyelectrolytic polymers for use in the present invention are the polymers of acrylic or methacrylic acid derivatives, for example, acrylic acid, the alkali metal and ammonium salts of methacrylic acid, acrylamide, methacrylamide, the N-alkyl substituted amides, the N-aminoalkylamides, and the corresponding N-alkylaminoalkyl substituted amides, the aminoalkyl acrylates, the aminoalkyl methacrylamides and the N-alkyl substituted aminoalkyl esters of either acrylic or methacrylic acids. These polymeric compositions may be homopolymers or they may be copolymers with other copolymerizing monomers, such as ethylene, propylene, isobutylene, styrene, a-methylstyrene, vinyl acetate, vinyl formate, alkyl ether, acrylonitrile, methacrylonitrile, vinyl chloride, vinylidene chloride, the alkyl acrylates, the alkyl methacrylates, the alkyl maleates, and the alkyl fumarites, and other olefinic monomers copolymerizable therewith. The copolymers of this type, having at least 50 mole percent of the acrylic or methacrylic acid derivatives, are preferred, and especially when the comonomer is hydrophobic or has no ionizable group. Polymers of this type may be prepared directly by the polymerization of suitable monomers, or by the after chemical reaction of other polymers, for example by the hydrolysis of acrylonitrile or methacrylonitrile polymers.

In connection with the various types of polyelectrolytic polymers suitable for the practice of this invention, the hydrophilic polymer may be prepared directly by the polymerization or copolymerization of one or more of the various available organic monomers with aliphatic unsaturation, if the said compounds contain a hydrophilic group, for example, carboxyl groups. Generally, more types of polyelectrolyte polymers can be prepared by subsequent reactions of polymers and copolymers. For example, polymers containing nitrile groups may be hydrolyzed to form water-soluble amide and carboxy containing polymers or hydrogenated to form amine-containing polymers. Similarly, copolymers of maleic anhydride and vinyl acetate may be hydrolyzed to form polymers containing hydrophilic lactone rings. Other hydrophilic polymers may be prepared by the hydrolysis of copolymers of vinyl acetate wherein the acetyl groups are removed leaving hydroxy groups which promote the solubilization effect of polyelectrolytic groups present. By other reactions nonhydrophilic polymers may be converted into lactam or amide containing polymers which are more hydrophilic. Polyvinyl alcohol, not in itself a polyelectrolyte, may be converted into polyelectrolytes by esterfication with dibasic acids, one of said carboxylic acid groups reacting with the alcohol radical and the other providing the hydrophilic characteristics by a carboxy group on the side chain. Still other types of polymers may be prepared by reacting halogen-containing polymers, for example, the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers may be prepared by the ammonolysis of ketone-containing polymers, for example, polyvinyl methyl Ketone. Similarly active halogen atoms may be reacted with bisulfite to substitute sulfonic acid group for the reactive halogens.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups, or derivatives thereof, heterocyclic nitrogen groups, aminoalkyl groups, alkoxy radicals and other organic groups, the number of which groups and the relative proportions of hydrophilic and hydrophobic groups being such as to provide a water-soluble polymeric compound having a substantially large number of ionizable radicals. The length of said continuous carbon chain must be such as to provide compounds having a weight average molecular weight of at least 10,000.

Among the various polymers as described above and water-soluble salts thereof useful in the practice of the present invention, there may be mentioned hydrolyzed polyacrylonitrile and polyacrylamide, sulfonated polystyrene, acrylamide-acrylic acid copolymers, polyacrylic acid, one-half calcium salt of hydrolyzed 1:1 copolymer of vinyl acetate-maleic anhydride, hydrolyzed styrenemaleic anhydride copolymer, ammonium polyacrylate, sodium polyacrylate, ammonium polymethacrylate, sodium polymethacrylate, diethanolammonium polyacrylate, guanidinium polyacrylate, dimethylaminoethyl polymethacrylate, acrylamide-acrylonitrile copolymer, methacrylic acid-dimethylaminoethyl methacrylate copolymer, sodium polyacrylate-vinyl alcohol copolymer, hydrolyzed methacrylic acid-acrylonitrile copolymer, vinyl acetate-maleic anhydride copolymer vinyl formatemaleic anhydride copolymer, vinyl methyl ether-maleic anhydride copolymer, isobutylene-maleic anhydride copolymer, styrenemaleic anhydride copolymer, ethyl acrylate-maleic anhydride copolymer, vinyl chloridemaleic anhydride copolymer, hydrolyzed acrylonitrile vinyl acetate copolymer, hydrolyzed acrylonitrile-methacrylonitrile copolymer, hydrolyzed acrylonitrile-methacrylonitrile-vinyl acetate terpolymer, hydrolyzed acrylonitrile-methacrylic acid copolymer, vinyl pyridine-acrylonitrile copolymer, etc. Polymers containing cationactive groups are also useful. Suitable compounds are, for example, ethyl acrylate and acrylamidopropylbenzyldimethylammonium chloride, copolymers of methylolacrylamide and acrylamidopropylbenzyldimethylammonium chloride, copolymers of butadiene and 2-vinyl pyridine, and certain quaternary compounds such as polydimethylaminostyrene quaternized with benzyl chloride, allyl chloride, etc. and quaternized copolymers of vinyl alcohol and morpholinylethylvinylether and the like.

The molecular weight of these polymers is fairly ambiguous. Molecular weights as low as 25,000 are useful as are molecular weights which range over 5 to 25 million. As long as the polymers are sufficiently low in molecular weight so as to be water soluble they have the characteristics required. Polymers of molecular weights of well over 2 million have such solubility. The difficulty of measuring molecular weights in the range of 2 to 25 million causes the numerical values to be somewhat ambiguous. Viscosity measurements particularly intrinsic viscosity determinations are particularly effective in attempting to determine the molecular weights in this range.

The polyacrylamides are particularly useful in the present invention. Polyacrylamide having a molecular weight of approximately 4 to 5 million gives good results.

Polyelectrolytes have centers of electronic activity along the chain. Polyacrylamides for instance usually have at least a few polyacrylic acid links along the chain and whereas for a molecular weight of a million or two, the percentage of such acid links is very small, still there are enough acid links or other centers of electronic activity to support the theory that a monomolecular film is formed on the surface of the equipment. Experimental analysis has verified that polymer coatings are formed on steel surfaces and that the coatings are of approximately monomolecular thickness. Such a film or coating appears to serve somewhat in the nature of a dielectric to inhibit galvanic action. Without being limited to the above or the following theories as to the operations involved in the present invention, the results which occur are consistent with these theories.

The polymers may be adsorbed on the surface to be protected by at least two distinctive types of bonding. Either or a combination of the two may be operative in a given time. The principal mode of attachment of polyacrylamide-type polymer is by hydrogen bonding. This is a common type of bonding exhibited by organic acids, amides, alcohols, amines and others which contain a hydrogen atom attached to a strongly electronegative atom. In these compounds the hydrogen atom has lost much of its electronic atmosphere, and is ready to accept electrons donated by the surface atoms of the iron or steel. The hydrogen is then shared between the surface atoms and the oxygen or nitrogen in the polymer.

Specific electrostatic site-bonding is another type of bonding which occurs when the polymer forms a saltlike attachment to specific sites on the solid surface of the equipment. In practice the number of functional groups forming such bonds is limited to carboxylates, phosphates, sulfonates and mercaptan derivatives.

During the course of experimental work on this invention a heat exchanger of a cooling water system was disassembled and was found to have a substantial formation of tubercles on the heads. A similar condition was observed in a tank used in connection with the same system. The system was reassembled and placed back into operation by adding about 2 parts of polyacrylamide per million parts of water. After about 6 months of operation under these conditions the heads of the heat exchanger and the tank were again examined and found to be entirely free of tubercles and had a smooth surface. The foul odor found in the tank before treatment was also eliminated.

The concentration of polymer needed for this action will vary with the molecular weight of the particular polymer used;

however, good results can be obtained by concentrations as low as 0.1 to 2 p.p.m.

In once-through systems and very large cooling towers, satisfactory results can be obtained by treating at these concentrations for as little as fifteen minutes to half an hour per day. Treatment for one hour a day is preferred for the first ninety days to remove existing tubercles. In smaller recirculating systems, where the cost is not a major factor compared to the problems that are encountered with corrosion, this concentration can be maintained continually. Experience and data accumulated to date also indicates that daily treatment of as little as 15 minutes eliminated the tubercle formation problem.

One of the outstanding features of these polymers is that they are virtually chemically inert and will not change the action of any other chemicals used in cooling water. Consequently, they can be added to systems that are already being treated with chemicals for scale formation, hardness and biological growth, without upsetting the chemical balance of the system.

It has been found that the effectiveness of a given polymer is dependent upon a number of considerations including the type of molecular weight of the polymer itself, the pH of the water, the severity of the existing tuberculation, and the concentration of electrolytes in the water. Where tuberculation is present in the advanced stages less than 2 percent by weight of the polymer, based on the weight of the water can be used and preferably less than 1 percent by weight may be used effectively. After the condition of severe tuberculation has been alleviated it is found that concentrations of polymer ranging from 0.1 to 1,000 parts of polymer per million parts of water is effective to inhibit further corrosion whether by tuberculation or other galvanic action. Clearly special situations can dictate different concentrations of the polymer but, unusually the most effective range is approximately 0.1 to 100 parts per million parts of water for normal operations. This method is as effective against corrosion of systems comprising steel tanks which remain stagnant for periods of time as it is against corrosion in flowing systems.

If desired, stock solutions can be prepared by adding 1 to 20 percent by weight of the polymer to water at a temperature of about 90° F. This concentrated solution then can be metered into the water flowing into the system to obtain the required concentration. Alternatively, a dry form of the polymer can be added to the system. This can be done by simply adding the dry particles to the water as it is taken in at the main inlet from its source. The water coming from the main source then can be piped into one or more different cooling systems.

While this invention has been described with reference to specific examples, it is to be understood that the invention is not intended to be limited to such examples, except as recited hereinafter in the appended claims.

The invention claimed is:

1. A method for removing tubercles of corrosion from their in situ position on a ferrous substrate and inhibiting further tubercle formation comprising, treating the surface with an aqueous solution of a polyelectrolytic organic polymer, said polymer being prepared from compounds characterized by the formula

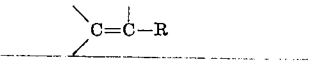

wherein R is selected from the group consisting of nitrile, amide and carboxyl radicals, said polymer having an average molecular weight ranging from about 25,000 to 25 million, the weight concentration of said polymer being approximately in the range 0.1 to 1,000 parts per million parts of water.

2. The method of claim 1 wherein said polymer is a copolymer.

3. The method of claim 1 wherein R is an amide radical.

4. The method of claim 1 wherein R is a carboxyl radical and is represented by the formula —COOM, wherein M is selected from the group consisting of hydrogen, ammonium, metals and organic radicals.

5. The method of claim 1 wherein the weight concentration of the polymer is approximately in the range 0.1 to 100 parts per million parts of water.

* * * * *